(12) United States Patent
Wilkes et al.

(10) Patent No.: US 8,605,567 B2
(45) Date of Patent: Dec. 10, 2013

(54) APPARATUSES AND METHODS FOR ENABLING CROSSTALK VECTORING IN EXPANDABLE COMMUNICATION SYSTEMS

(75) Inventors: John Wilkes, Toney, AL (US); Ben Dyer, Huntsville, AL (US); Tom Ballard, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 86 days.

(21) Appl. No.: 13/042,148

(22) Filed: Mar. 7, 2011

(65) Prior Publication Data

US 2012/0147932 A1 Jun. 14, 2012

Related U.S. Application Data

(60) Provisional application No. 61/419,117, filed on Dec. 2, 2010.

(51) Int. Cl.
*H04B 1/38* (2006.01)
(52) U.S. Cl.
USPC .......................................................... 370/201
(58) Field of Classification Search
USPC ......................................... 370/201, 222, 282
See application file for complete search history.

(56) References Cited

U.S. PATENT DOCUMENTS

| | | | |
|---|---|---|---|
| 6,292,859 | B1 | 9/2001 | Santiago |
| 8,311,348 | B2 * | 11/2012 | Lee et al. ....................... 382/232 |
| 2001/0018721 | A1 | 8/2001 | McKenna et al. |
| 2003/0086514 | A1 * | 5/2003 | Ginis et al. .................... 375/346 |
| 2004/0057224 | A1 | 3/2004 | Kiko |
| 2005/0129218 | A1 | 6/2005 | Kimble et al. |
| 2009/0316717 | A1 | 12/2009 | Almalki |
| 2010/0013432 | A1 * | 1/2010 | Toya et al. ..................... 320/108 |
| 2010/0054316 | A1 | 3/2010 | Mishra et al. |
| 2010/0091661 | A1 | 4/2010 | Cordsmeyer et al. |
| 2011/0123195 | A1 | 5/2011 | Frigo et al. |

* cited by examiner

*Primary Examiner* — Andrew Lai
*Assistant Examiner* — Zhiren Qin
(74) *Attorney, Agent, or Firm* — Maynard, Cooper & Gale, P. C.; Jon E. Holland

(57) ABSTRACT

A communication system utilizes at least one digital subscriber line access multiplexer (DSLAM) at an intermediate point between a network facility and one or more customer premises. Initially, as few as one DSLAM, may be implemented at the intermediate point, but the system can be expanded to include any number of DSLAMs at the intermediate point. Any of the DSLAMs at the intermediate point can be selectively upgraded at any time to a vectoring solution as may be desired. The use of such DSLAMs provides the network service provider with flexibility in implementing and maintaining the network.

18 Claims, 9 Drawing Sheets

APPARATUSES AND METHODS FOR ENABLING CROSSTALK VECTORING IN EXPANDABLE COMMUNICATION SYSTEMS

CROSS REFERENCE TO RELATED APPLICATION

This application claims priority to U.S. Provisional Patent Application No. 61/419,117, entitled "Apparatuses and Methods for Crosstalk Vectoring in Expandable Communication Systems," and filed on Dec. 2, 2010, which is incorporated herein by reference.

RELATED ART

A digital subscriber line access multiplexer (DSLAM) is a device that connects multiple subscriber lines to a high-speed network line using digital subscriber line (DSL) modulation formats across the subscriber lines. In the downstream direction, a DSLAM generally demultiplexes a high-speed data stream from a network across the subscriber lines, and in the upstream direction, a DSLAM generally multiplexes the data streams from the subscriber lines for transmission across the high-speed network line. A DSLAM can be installed at a variety of locations, such as at a network facility (e.g., a central office) or an intermediate point between a central office and one or more customer premises.

A variety of DSL formats have been used for the communication from a DSLAM to a customer premises. Very-high-bit-rate DSL (VDSL) is a solution that is attractive due to the relatively high data rates enabled by VDSL as compared to other DSL solutions. Indeed, first generation VDSL provides data transmission up to about 52 Mega-bits per second (Mbit/s) downstream and about 16 Mbit/s upstream. Second generation VDSL, sometimes referred to as VDSL2, provides up to about 100 Mbit/s simultaneously in the both the upstream and downstream directions.

Like several other DSL technologies, VDSL suffers from the effects of crosstalk. However, VDSL standards specify vectoring techniques that allow crosstalk cancellation, and such techniques have been employed to cancel the crosstalk among subscriber lines extending from a DSLAM to one or more customer premises in an effort to improve the performance of VDSL signals and allow for longer reaches. However, VDSL vectoring is processing intensive, and as the number of subscriber lines increases, the amount of processing required to cancel crosstalk from the signals carried by the subscriber lines increases exponentially.

The vectoring logic, often referred to as a "vector engine," is typically implemented within an integrated circuit (IC) dedicated for performing the VDSL vectoring operations. A vector engine typically receives the tones communicated across or to be communicated across a set of subscriber lines. For a given tone, the vector engine calculates crosstalk contributions from other interfering tones and combines the calculated crosstalk contributions with the symbol of the given tone to cancel crosstalk from such symbol. A single vector engine can process the coefficients for a limited number of tones, but additional vector engines can be added in order to increase the number of tones subject to the VDSL vectoring.

Unfortunately, vector engines are expensive, and the use of vector engines may be limited in situations where the performance gains enabled by VDSL vectoring are deemed to be too costly. Accordingly, not all VDSL transceiver modules are manufactured with VDSL vector engines for cancelling crosstalk. When installing a VDSL transceiver module, a network service provider has the option of selecting between a vectoring solution or a less expensive non-vectoring solution. If the network service provider elects to install a non-vectoring VDSL transceiver module, the network service provider may later face the possibility of replacing the non-vectoring VDSL transceiver if it is determined that vectoring is necessary or desirable. Such replacement can be burdensome, particularly when the transceiver module is implemented in a DSLAM that is located in an outside plant environment.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for enabling crosstalk vectoring in expandable communication systems. In one exemplary embodiment, a communication system utilizes at least one digital subscriber line access multiplexer (DSLAM) at an intermediate point between a network facility, such as a central office, and one or more customer premises. Initially, as few as one DSLAM, may be implemented at the intermediate point, but the system can be expanded to include any number of DSLAMs at the intermediate point.

In addition, each DSLAM has at least two segregated compartments, one of which is access restricted and the other of which is not. A non-vectoring transceiver module is positioned in the access-restricted compartment. The other compartment, referred to hereafter as the "customer-accessible compartment," has space in which a module, referred to hereafter as "expansion module," having at least one vector engine may be inserted. A data connection extends from the transceiver module through a wall separating the compartments thereby permitting a technician to interface the expansion module with the transceiver module without obtaining access to the access-restricted compartment. The expansion module performs crosstalk vectoring for the tones communicated by the transceiver module such that the DSLAM is migrated from a non-vectoring solution to a vectoring solution by addition of the expansion module without having to replace or even access the transceiver module.

The other DSLAMs, if any, implemented at the intermediate point are similarly configured such that they may be similarly upgraded to a vectoring solution as may be desired. The use of such DSLAMs provides the network service provider with flexibility in implementing and maintaining the network. Indeed, a network service provider may implement the DSLAMs and upgrade any number of the DSLAMs to a vectoring solution as may be desired. Since any of the non-vectoring DSLAMs may be easily upgraded to a vectoring solution at any time, the network service provider may elect to implement at least some of the DSLAMs without vectoring depending on the current needs of the service provider. Later, if more vectoring is desired, the service provider can easily add expansion modules to any of the non-vectoring DSLAMs and/or add vectoring DSLAMs without having to access or replace the transceiver modules in any of the previously installed DSLAMs.

Figure 1:
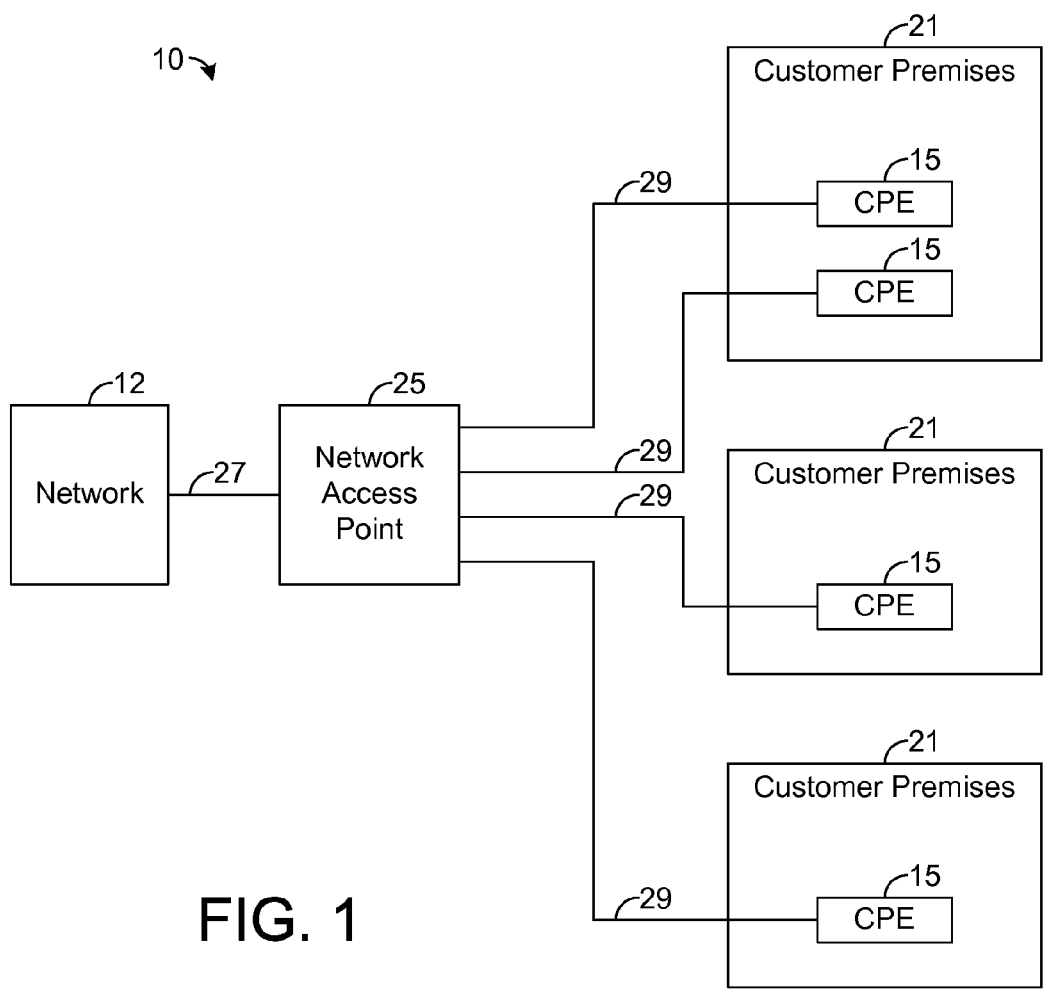
FIG. 1 is a block diagram illustrating an exemplary embodiment of a communication system in accordance with the present disclosure.

FIG. 1 depicts an exemplary embodiment of a communication system 10. As shown by FIG. 1, the system 10 comprises a network 12, such as the public switched telephone network (PSTN) or other communication network, for communication with CPE 15 at one or more customer premises 21. In this regard, the network 12 is coupled to a network access point 25 via a network line 27, such as one or more twisted-wire pairs or optical fibers, and the network access point 25 is coupled to the CPE 15 via a plurality of subscriber lines 29, such as twisted-wire pairs or optical fibers. For simplicity, FIG. 1 depicts four subscriber lines 29, but there can be any number of subscriber lines 29 in other embodiments.

In a downstream direction, the network access point 25 receives a high-speed data stream from the network 12 via the network line 27 and demultiplexes the high-speed data stream across the plurality of subscriber lines 29. In an upstream direction, the network access point 25 receives data streams from the customer premises 21 via the subscriber lines 29 and multiplexes such data streams onto the network line 27 for transmission to the network 12.

In one exemplary embodiment, the network line 27 comprises an optical fiber, and optical modulation formats are used to communicate data across the fiber. In addition, each subscriber line 29 comprises at least one twisted-wire pair, and digital subscriber line (DSL) modulation formats are used to communicate data across the subscriber lines 29. In such an embodiment, the network access point 25 comprises at least one DSL access multiplexer (DSLAM), as will be described in more detail hereafter.

Note that there are a variety of DSL modulation formats that may be used for communicating data across the subscriber lines 29, such as asymmetric DSL (ADSL), high-bit-rate DSL (HDSL), very-high-bit-rate DSL (VDSL), and single-pair HDSL (SHDLS). For illustrative purposes, it will be assumed hereafter that the modulation format used for each subscriber line is VDSL, such as first generation VDSL or VDSL2, but it should be emphasized that other DSL and/or non-DSL modulation formats may be used in other embodiments.

As will be described in more detail hereafter, the DSLAMs (not shown in FIG. 1) implemented at the network access point 25 are configured to provide the network service provider with flexibility in configuring the network access point 25. Specifically, the DSLAMs are configured to allow the network service provider to initially implement any number of DSLAMs at the network access point 25 and to then easily migrate to a greater number of DSLAMs as the demand for services increases. Also, to keep costs low, each DSLAM is manufactured without having sufficient components, such as vector engines, for enabling crosstalk vectoring. However, if it is desired either before or after installation to migrate any DSLAM to a vectoring solution, an expansion module having one or more vector engines may be easily added to the DSLAM to perform crosstalk vectoring, as will be described in more detail hereafter.

Figure 2:
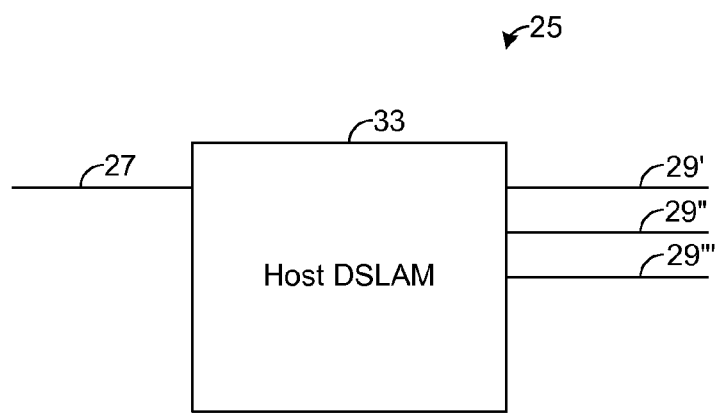
FIG. 2 is a block diagram illustrating an exemplary embodiment of a network access point, such as is depicted by FIG. 1.

FIG. 2 depicts an exemplary DSLAM 33 that may be implemented at the network access point 25. On a network side, the DSLAM 33 is coupled to the network line 27, such as an optical fiber, and receives the data stream carried by the line 27. Such DSLAM 33 is referred to herein as the "host DSLAM." On a customer premises (CP) side, the DSLAM is coupled to CPE 15 (FIG. 1) via a plurality of subscriber lines 29, such as twisted-wire pairs. The exemplary embodiment shown by FIG. 2 shows the host DSLAM 33 coupled to four subscriber lines 29, but the DSLAM 33 may be coupled to any number of subscriber lines 29 in other embodiments.

In one exemplary embodiment, the network access point 25 is situated in an outside plant environment, and each DSLAM of the network access point 25, such as the host DSLAM 33, has an environmentally hardened housing (not shown in FIG. 2) for housing the electrical components of the DSLAM. Commonly-assigned U.S. patent application Ser. No. 12/619,397, entitled "Access Multiplexers and Methods for Multiplexing Telecommunication Signals Using an Arrayed Media Converter" and filed on Nov. 16, 2009, which is incorporated herein by reference, describes an exemplary housing for a DSLAM. Such housing is water-tight and is composed of a material that is conductive to heat to help sink heat from the electronics within the housing.

Figure 3:
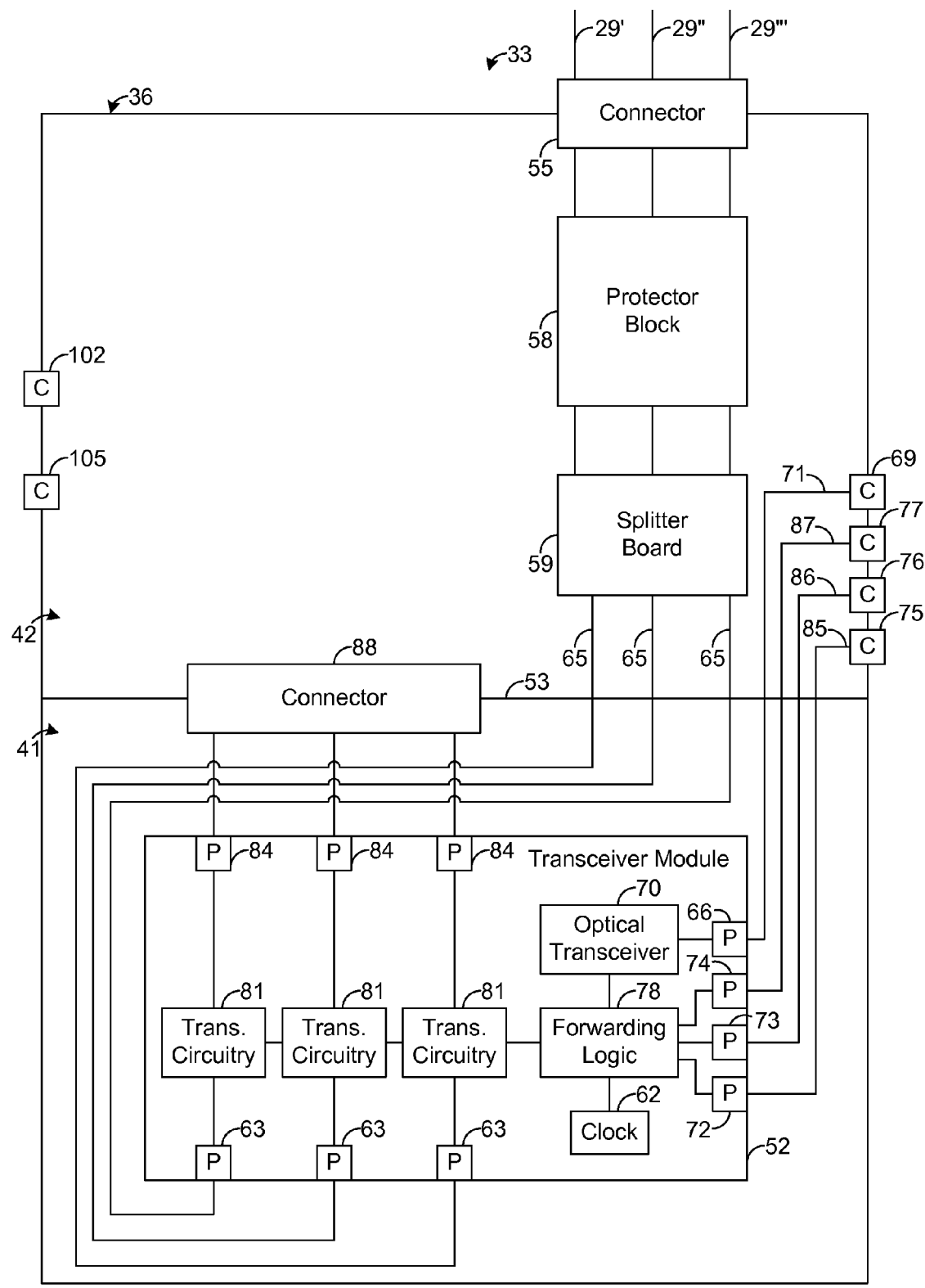
FIG. 3 is a block diagram illustrating an exemplary embodiment of a host DSLAM, such as is depicted by FIG. 2.

FIG. 3 depicts an exemplary embodiment of the host DSLAM 33. A housing 36 of the DSLAM 33 has two compartments 41 and 42. A non-vectoring transceiver module 52 is situated in one compartment 41, which is access restricted. That is, the housing 36 is designed to make it difficult for a customer to access the electronics within the compartment 41, referred to as the "access-restricted compartment." As an example, the access-restricted compartment 41 may be covered by a panel (not shown) of the housing 36 that is secured by one or more screws hidden from view when the DSLAM 33 is installed. However, it is unnecessary for the compartment 41 to be access restricted in other embodiments, and other techniques for restricting access to the compartment 41 are possible. In one exemplary embodiment, the transceiver module 52 comprises a single printed circuit board (PCB) on which the other components of the transceiver module 52 reside, but other number of PCBs and other configurations of the transceiver module 52 are possible in other embodiments.

The other compartment 42 is customer accessible and is referred to as the "customer-accessible compartment." As an example, the customer-accessible compartment 42 may be covered by a panel (not shown) of the housing 36 that is secured by one or more screws that are readily within view when the DSLAM 33 is installed. Thus, a customer should be able to readily find and access such screws in order to remove the panel and gain access to the compartment 42. Other techniques for facilitating a customer's access to the compartment 42 are possible. As shown by FIG. 3, the customer-accessible compartment 42 is separated from the access-restricted compartment 41 by an interior wall 53 of the housing 36.

As shown by FIG. 3, a connector 55 is coupled to a plurality of subscriber lines 29', 29'', 29'''. In this regard, the connector 55 passes through an exterior wall of the compartment 42 and at least a portion of the connector 55 is exposed thereby enabling the subscriber lines 29', 29'', 29''' to be connected to it. The connecter 55 is coupled to a protector block 58, which prevents current surges from lightning strikes or power faults from passing through the block 58 and damaging the components of the transceiver module 52. Exemplary protector blocks are described in commonly-assigned U.S. Pat. No. 7,701,689, entitled "Protector Block Assembly for Providing Surge Protection in Telecommunication Systems" and filed on Jan. 31, 2008, which is incorporated herein by reference.

The protector block 58 is coupled to a PCB 59, referred to herein as a "splitter board," on which a plurality of splitters (not specifically shown) reside. Each such splitter is coupled to a respective subscriber line 29', 29'', 29'''. As shown by FIG. 3, the splitter board 59 is coupled to a plurality of ports 63 of the transceiver module 52 via data connections 65 that pass through the compartment wall 53. In this regard, each splitter of the splitter board 59 is coupled to a respective port 63. Accordingly, each subscriber line 29', 29'', 29''' is conductively coupled to a respective one of the ports 63 via the protector block 58, splitter board 59, and data connections 65.

As shown by FIG. 3, the transceiver module 52 has a clock 62 for controlling timing of operations within the transceiver module 52 and, specifically, a timing of the signals communicated across the subscriber lines 29', 29'', 29'''. The transceiver module 52 also has a port 66 that is coupled to the network line 27 (FIG. 2) through a connector 69. The connector 69 passes through an exterior wall of the compartment 42 and at least a portion of the connector 69 is exposed thereby enabling the network line 27 to be connected to it. As shown by FIG. 3, the port 66 is coupled to the connector 69 via a conductive data connection 71 that passes through the interior wall 53.

In one exemplary embodiment, the network line 27 is implemented via an optical fiber, and the optical signals carried by the line 27 bypass the protector block 58 and splitter board 59. In such an embodiment, the transceiver module 52 comprises an optical transceiver 70 configured to receive optical signals from the line 27 and to demodulate such signals to recover the data carried by the line 27. In the opposite direction, the optical transceiver 70 modulates an optical signal with data to be transmitted across the network line 27 and transmits the modulated optical signal across the line 27 to the network 12 (FIG. 1). In another exemplary embodiment, the network line 27 may comprise one or more conductive connections, such as twisted-wire pairs, coupled to one or more transceivers (not shown) through the protector block 58 and splitter board 59.

As shown by FIG. 3, the transceiver module 52 has a plurality of ports 72-74 respectively coupled to connectors 75-77 via a plurality of data connections 85-87 that pass through the interior wall 53. As will be described in more detail hereafter, the connectors 75-77 may be coupled to other DSLAMs (not shown in FIG. 3) implemented at the network access point 25 to pass data between such DSLAMs and the host DSLAM 33 shown by FIG. 3. Each connector 75-77 passes through an exterior wall of the compartment 41 and at least a portion of each connector 75-77 is exposed thereby enabling the other DSLAMs to be connected to it.

In operation, a modulated optical signal from the network 12 (FIG. 1) is received via the port 66, which is coupled to the optical transceiver 70. The optical transceiver 70 is configured to demodulate the received optical signal to recover data packets, which are then transmitted to forwarding logic 78. Except for packets to be communicated by other DSLAMs (not shown in FIG. 3) at the network access point 25, as will be described in more detail hereafter, the forwarding logic 78 is configured to map each packet received from the network 12 to a respective port 63 such that the packet is communicated across the subscriber line 29', 29'', 29''' that is coupled to such port 63.

In one exemplary embodiment, the forwarding logic 78 associates each such packet with a port identifier identifying the port 63 to which the packet is mapped, and the forwarding logic 78 forwards the packet to transceiver circuitry 81. Each such packet is processed by a respective set of transceiver circuitry 81 before being transmitted to a subscriber line 29', 29'', 29'''. As an example, the set of transceiver circuitry 81 that is coupled to the port 63 identified by the port identifier associated with a given packet is configured to modulate a carrier signal with the data defined by such packet and to transmit the modulated signal to the identified port 63 and ultimately to the subscriber line 29', 29'', 29''' coupled to the identified port 63. For illustrative purposes it will be assumed hereafter that the modulation format used by the transceiver circuitry 81 is VDSL, but it should be emphasized that other modulation formats are possible in other embodiments. In one exemplary embodiment, each set of transceiver logic 81 services sixteen ports 63 such that the host DSLAM 33 can service up to 48 subscriber lines. However, in other embodiments, other numbers of ports 63 are possible, and it is possible for each set of transceiver logic 81 to service other numbers of ports 63 and, hence, subscriber lines.

In the upstream direction, modulated signals are received by the ports 63 from the subscriber lines 29', 29'', 29'''. For each such modulated signal, the set of transceiver circuitry 81 that is coupled to the port 63 receiving such signal is configured to demodulate the signal to recover data packets. Such data packets are forwarded to the forwarding logic 78, which multiplexes the data packets into a data stream that is received by the optical transceiver 70. The optical transceiver 70 is configured to modulate an optical signal with the data packets and to transmit the modulated optical signal via the port 66 across the network line 27.

As shown by FIG. 3, the sets of transceiver logic 81 are coupled to ports 84, which are conductively coupled to a connector 88. The connector 88 passes through an interior wall 53 of the housing 36 separating the compartments 41 and 42, and the connector 88 may be coupled to components that reside in the compartment 42. As will be described in more detail hereafter, the connector 88 may be coupled to an expansion module for enabling crosstalk vectoring so that crosstalk can be canceled from the signals communicated across the subscriber lines 29', 29'', 29'''. In this regard, the compartment 42 includes a space into which such an expansion module may be inserted when crosstalk vectoring is desired. Until such an expansion module is inserted into the compartment 42 and interfaced with the transceiver module 52 via the ports 84 and connector 88, the sets of transceiver logic 81 are configured to transmit and receive VDSL signals without performing crosstalk vectoring. However, as will be described in more detail hereafter, once such an expansion module is inserted into the compartment 42 and interfaced with the transceiver module 52, crosstalk vectoring is performed such that crosstalk in the signals communicated by the subscriber lines 29', 29'', 29''' is cancelled.

In this regard, it is well-known that crosstalk can degrade the quality of signals communicated across subscriber lines.

In particular, the subscriber lines serviced by a DSLAM are typically in close proximity to one another (e.g., within the same binder) at one or more points between the DSLAM and customer premises such that energy from one subscriber line couples to other subscriber lines and interferes with the signals propagating along the other subscriber lines. Even if subscriber lines are not physically located in the same binder, the ends of the subscriber lines may be in close proximity at or within the DSLAM such that energy can couple from one subscriber line to another and interfere with the signals being communicated. Interference that couples from one communication connection to another is referred to as crosstalk, and the effects of crosstalk can be significant, particularly for high-bandwidth signals, such as those that are typically employed in VDSL.

Figure 4:
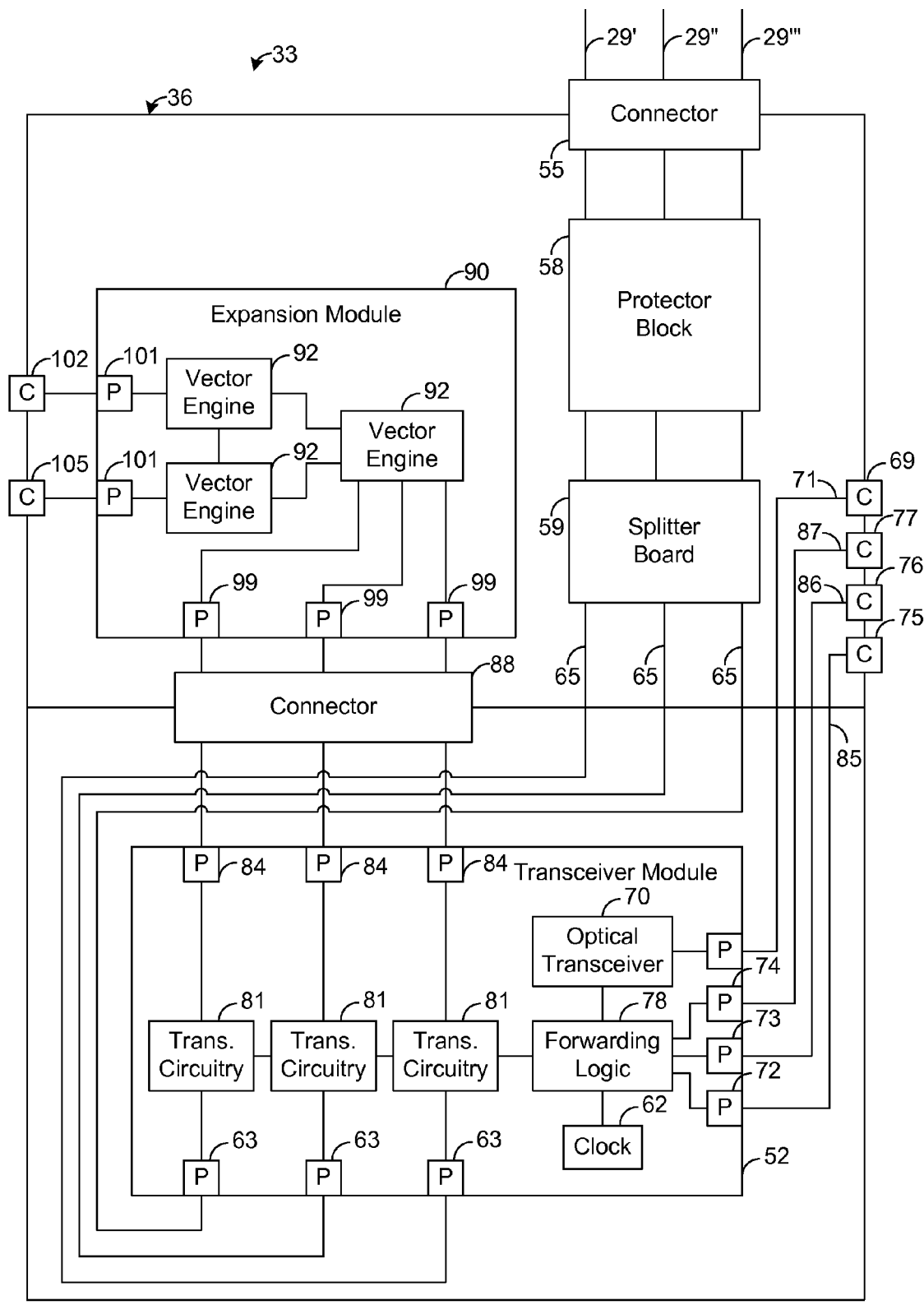
FIG. 4 is a block diagram illustrating the host DSLAM of FIG. 3 after an expansion module has been added to the host DSLAM.

To enable crosstalk cancellation, an expansion module 90 having at least one vector engine 92 can be inserted into the customer-accessible compartment 42 and coupled to the connector 88, as shown by FIG. 4. The exemplary expansion module 90 of FIG. 4 has three vector engines 92, but the module 90 may have any number of vector engines 92 in other embodiments. In one exemplary embodiment, the expansion module 90 comprises a single PCB on which other components of the expansion module 90, such as the vector engines 92, reside. In other embodiments, other numbers of PCBs and/or other configurations of the expansion module 90 are possible. As shown by FIG. 4, the expansion module 90 has a plurality of ports 99 that are respectively coupled to the ports 84 of the transceiver module 52 via the connector 88 to which the expansion module 90 is detachably coupled. The expansion module 90 also has ports 101 that are respectively coupled to connectors 102 and 105, which can be coupled to other DSLAMs, as will be described in more detail hereafter. Each connector 102 and 105 passes through an exterior wall of the compartment 42 and at least a portion of each connector 102 and 105 is exposed thereby enabling the other DSLAMs to be connected to it.

Figure 5:
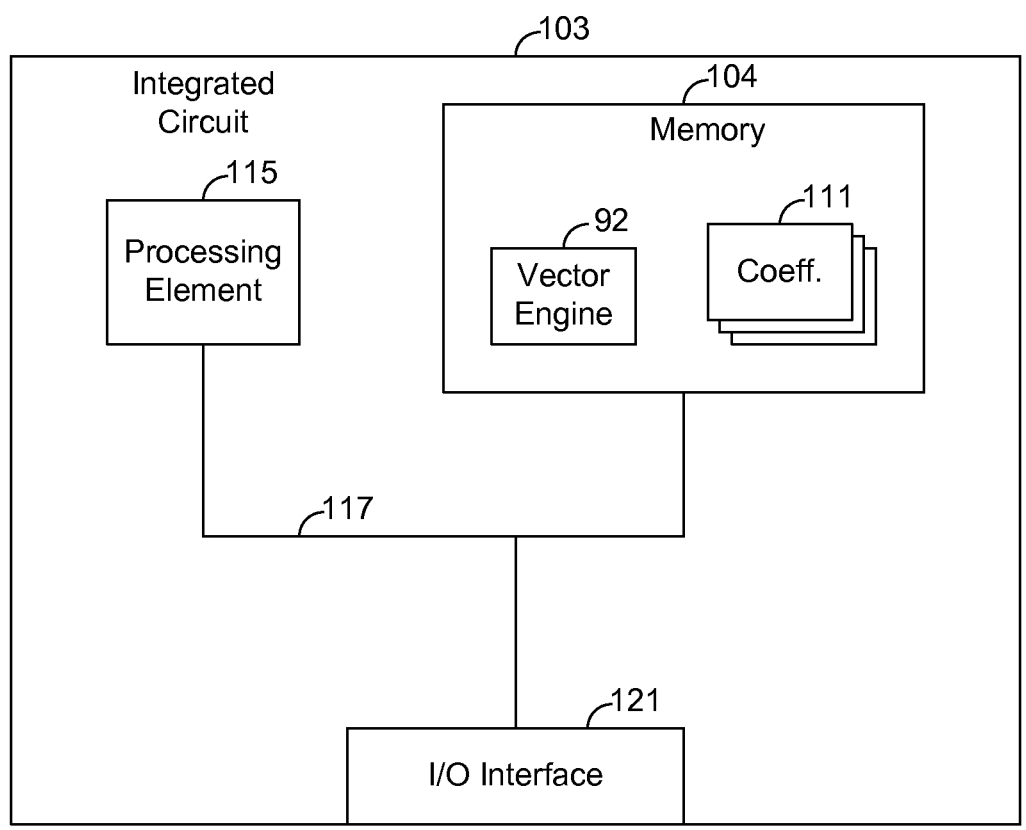
FIG. 5 is a block diagram illustrating an exemplary embodiment of an integrated circuit implementing a vector engine, such as is depicted by FIG. 4.

In one exemplary embodiment, each vector engine 92 is implemented in software and stored within a respective integrated circuit (IC) of the expansion module 90. FIG. 5 depicts an exemplary IC 103 in which one of the vector engines 92 is implemented. The other vector engines 92 may be similarly implemented in other integrated circuits according to the IC 103 shown by FIG. 5, but other configurations of the vector engines 92 are possible in other embodiments. As shown by FIG. 5, the vector engine 92 is implemented in software and stored within memory 104 of an IC package. In other embodiments, the vector engine 92 may be implemented in hardware, firmware, or any combination of hardware, firmware, and/or software. The vector engine 92 maintains sets of coefficients 111 to be used for cancelling crosstalk in the VDSL signals communicated across the subscriber lines 29', 29", 29''', as will be described in more detail hereafter.

The exemplary embodiment of the IC 103 depicted by FIG. 5 comprises at least one conventional processing element 115, such as a central processing unit (CPU), that communicates to and drives the other elements within the IC 103 via a local interface 117, which can include at least one bus. Furthermore, an input/output (I/O) interface 121, such as pins of the IC package, are coupled to conductive traces on the expansion module 90 to allow communication with components external to the IC 103, such as the ports 99 and 101.

Each VDSL signal typically carries a plurality of tones, and each set of coefficients 111 corresponds to a respective one of the tones communicated by the DSLAM 33 across a subscriber line 29', 29", 29'''. The set of coefficients 111 corresponding to a tone received by the DSLAM 33 from a subscriber line 29', 29", 29''' is used to filter, tone-by-tone, the crosstalk induced by the interfering tones being communicated by the other subscriber lines.

For illustrative purposes, assume that there are three subscriber lines 29', 29", 29''' as shown by FIG. 2, and that each VDSL signal communicated across each subscriber line has three tones. In such an example, for a given one of the tones, referred to in this example as the "victim tone," there are at least two interfering tones. In particular, assuming that the victim tone is carried by subscriber line 29', which is referred to as the "victim subscriber line" in this example, there is one interfering tone carried by subscriber line 29" in the same frequency range as the victim tone, and there is one interfering tone carried by subscriber line 29''' in the same frequency range as the victim tone. Thus, the set of coefficients 111 corresponding to the victim tone has at least two coefficients. Each such coefficient is associated with a respective one of the interfering tones carried by a respective one of the other subscriber lines 29", 29''', referred to as "interfering subscriber lines" in this example. In particular, one of the coefficients, referred to as "$a_1$," is associated with the interfering tone carried by the subscriber line 29", and the other coefficient, referred to as "$a_2$," is associated with the interfering tone carried by the subscriber line 29'''.

As the VDSL signals are received by the DSLAM 33, each VDSL signal is demodulated on the transceiver module 52 to recover symbols of the three tones carried by such signal, and the recovered symbols are transmitted to the vector engine 92. For the current symbol of the victim tone corresponding to a set of coefficients 111 comprising $a_1$ and $a_2$ in this example, the vector engine 92 estimates a respective crosstalk contribution from each of the interfering tones carried by the interfering subscriber lines 29" and 29'''. As an example, the vector engine 92 combines (e.g., multiplies) the symbol of the interfering tone from subscriber line 29" with the coefficient $a_1$ to estimate a crosstalk contribution from this interfering tone affecting the symbol of the victim tone. The vector engine 92 combines (e.g., subtracts) the estimated crosstalk contribution with the symbol of the victim tone such that the crosstalk induced by the interfering tone from the interfering subscriber line 29" is canceled. This process is repeated for each interfering tone. In particular, the vector engine 92 combines (e.g., multiplies) the symbol of the interfering tone carried by the subscriber line 29' with the coefficient $a_2$ to estimate a crosstalk contribution from this interfering tone affecting the symbol of the victim tone. The vector engine 92 combines (e.g., subtracts) the estimated crosstalk contribution with the symbol of the victim tone such that the crosstalk induced by the interfering tone from the interfering subscriber line 29''' is canceled. Thus, the processing performed by the vector engine 92 for each of the interfering tones from the subscriber lines 29", 29''' effectively filters the symbol of the victim tone to remove the crosstalk induced by the interfering tones. The process of respectively associating the symbols of the interfering tones with the coefficients corresponding to the victim tone is generally referred to as vectoring.

After cancelling the crosstalk affecting the symbol of the victim tone, the vector engine 92 transmits the symbol to the set of transceiver logic 81 from which the symbol was originally received. Such set of transceiver logic 81 decodes the symbol and provides an error signal indicative of an amount of error in such symbol. This error signal is transmitted to the vector engine 92, which then adaptively updates the set of coefficients 111 corresponding to the victim tone (e.g., the coefficients $a_1$ and $a_2$ used to cancel the crosstalk from the symbol of the victim tone) so that the set of coefficients 111 is adapted to changing crosstalk characteristics over time. As an example, the least means squares (LMS) algorithm or some other known coefficient update algorithm may be used to update the set of coefficients 111 based on the error signal. Moreover, the vector engine 92 similarly maintains a respective set of coefficients 111 for each tone received by the DSLAM 33 from the subscriber lines 29', 29", 29"', thereby enabling the vector engine 92 to cancel crosstalk for all of the received tones via similar techniques.

Note that the vector engine 92 is configured to use techniques similar to those described above in order to precode the downstream signals transmitted by the DSLAM 33 across the subscriber lines 29', 29", 29"', respectively, to mitigate for crosstalk affecting these signals. In this regard, the vector engine 92 maintains a respective set of coefficients 55 for each downstream tone transmitted by the DSLAM 33, as described above for the upstream tones received by the DSLAM 33 from the subscriber lines 29', 29", 29"'.

For illustrative purposes, assume that the victim subscriber line 29' carries a downstream tone, referred to hereafter as the "victim transmit tone" for this example, that is affected by crosstalk from tones, referred to hereafter as the "interfering transmit tones" for this example, transmitted by the DSLAM 33 across the interfering subscribe lines 29", 29"'. For the set of coefficients 111 corresponding to the victim transmit tone, each coefficient is associated with a respective interfering transmit tone communicated across the interfering subscriber lines 29", 29"'. Before transmitting a symbol of the victim transmit tone, the set of transceiver logic 81 processing such symbol provides the symbol to the vector engine 92, and the symbols of the interfering transmit tones to be transmitted across the other subscriber lines 29", 29"' at the same time as the symbol for the victim transmit tone are similarly provided to the vector engine 92. The symbol of each interfering transmit tone is associated with a respective coefficient to estimate the amount of crosstalk contribution from this interfering transmit tone expected to affect the symbol of the victim transmit tone. The vector 92 then combines the inverse of the estimated crosstalk contribution with the symbol of the victim transmit tone to precode the victim transmit tone.

After performing such precoding of the symbol of the victim transmit tone for each interfering transmit tone, the precoded symbol of the victim transmit tone is transmitted by the vector engine 92 to the set of transceiver logic 81 from which the victim tone was originally received, and such set of transceiver logic 81 modulates a carrier signal with the precoded symbol for transmission across the victim subscriber line 29'. The crosstalk that then couples to the victim subscriber line 29' affecting the symbol of the victim transmit tone is effectively cancelled due to the precoding such that the symbol arrives at the CPE 15 coupled to the victim subscriber line 29' substantially free of crosstalk.

The CPE 15 that receives the victim tone is configured to decode the precoded symbol and determine an error for such symbol. The CPE 15 then transmits an error signal indicative of such error back to the DSLAM 33 so that the corresponding set of coefficients 111 (i.e., the coefficients used to precode the victim transmit tone) can be adaptively updated to account for changing crosstalk characteristics. Moreover, the vector engine 92 similarly maintains a corresponding set of coefficients 111 for each tone transmitted by the DSLAM 33 across the subscriber lines 29', 29", 29"' thereby enabling the vector engine 92 to precode the signals transmitted by DSLAM 33 in order to cancel crosstalk for all of the downstream tones via similar techniques.

It should be noted that there may be any number of subscriber lines 29', 29", 29"' and any number of tones per subscriber line. As the number of tones increases, the amount of processing required to cancel crosstalk from each tone generally increases exponentially. To increase the number of interfering tones that can be cancelled and the number of victim tones that can be processed, multiple vector engines 92 are used. For each victim tone, each vector engine 92 may maintain coefficients associated with different interfering tones. Thus, one vector engine 92 may cancel from a victim tone the crosstalk contributions induced by a set of interfering tones and then pass the victim tone to another vector engine 92 that then cancels from the victim tone the crosstalk contributions induced by a different set of interfering tones. Accordingly, multiple vector engines 92 can generally cancel the effects of a higher number of interfering tones from a victim tone than a single vector engine, assuming that all of the vector engines have similar cancellation capabilities. Thus, using a higher number of vector engines 92 generally increases the crosstalk vectoring capabilities of the expansion module 90 albeit at a higher cost.

It should be further noted that the upstream and downstream channels across the subscriber lines 29', 29", 29"' are frequency division multiplexed according to current VDSL standards. That is, the frequency of the signals transmitted upstream is different than the frequency of the signals transmitted downstream. As long as the transceiver circuitry at each end remains synchronous and orthogonality is maintained across the tones, there should be no "bleeding" or crosstalk interference from the upstream VDSL signals to the downstream VDSL signals and vice versa.

Figure 6:
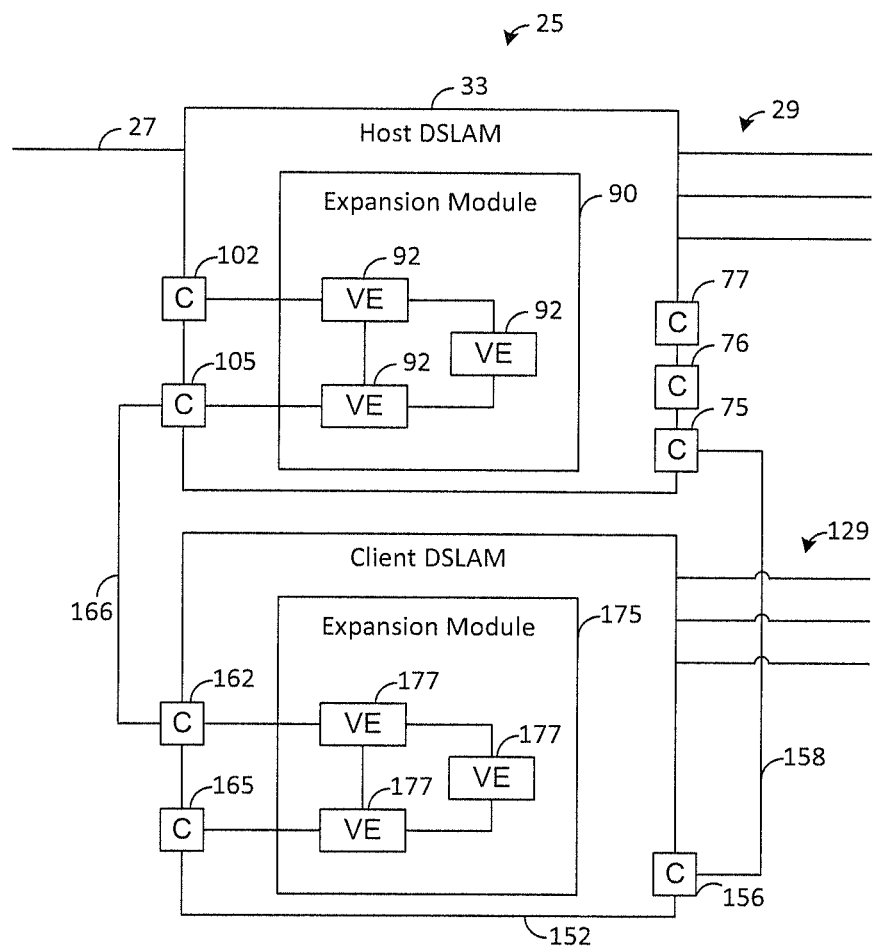
FIG. 6 is a block diagram illustrating an exemplary embodiment of a network access point, such as is depicted by FIG. 1.

To increase the number of subscriber lines that can be serviced by the network access point 25, a client DSLAM 152 may be installed and coupled to a set of subscriber lines 129, as shown by FIG. 6, which extend to CPE 15 at one or more customer premises 21. The client DSLAM 152 may be installed at the same time as the host DSLAM 33 or after installation of the DSLAM 33, such as when demand for services justifies the installation of an additional DSLAM.

As shown by FIG. 6, the client DSLAM 152 has a connector 156 that is coupled to the connector 75 of the host DSLAM 33 by a data connection 158. The connection 158 may be any type of conductive connection, such as a twisted-wire pair, or other type of connection, such as an optical fiber, that permits the transport of data. In one exemplary embodiment, the data connection 158 is implemented via an Ethernet cable, such as a Category 5 (Cat 5) cable. Data communicated across the subscriber lines 129 coupled to the client DSLAM 152 is passed between the DSLAMS 33 and 152 via the connection 158.

For example, as described above with reference to FIG. 3, the forwarding logic 78 receives data packets from the network line 27. Packets to be transmitted across the subscriber lines 29 are forwarded to the sets of the transceiver logic 81 of the host DSLAM 33. However, packets to be transmitted across the subscriber lines 129 coupled to the client DSLAM 152 are forwarded to the connector 75 such that they are transmitted across the connection 158 to the client DSLAM 152. The client DSLAM 152 then modulates carrier signals with the data packets and transmits the modulated signals across the subscriber lines 129 coupled to it.

In the upstream direction, the client DSLAM 152 receives modulated data signals from the subscriber lines 129. The client DSLAM 152 demodulates such signals to recover data packets and transmits such packets via the connector 156 to the host DLSAM 33. The host DSLAM 33 multiplexes such packets with the packets received from the subscriber lines 29 that are coupled to the host DSLAM 33, thereby forming a high-speed data stream that is used to modulate an optical signal for transmission across the network line 27 to the network 12.

As described above for the host DSLAM 33, the client DSLAM 152 is manufactured without vector engines but can be migrated to a crosstalk vectoring solution by adding an expansion module with vector engines when desired. If the client DSLAM 152 is so migrated to a crosstalk vectoring solution, a connector 162 of the client DSLAM 152 is coupled to the connector 105 of the host DSLAM 33 via a data connection 166. The connection 166 may be any type of conductive connection, such as a twisted-wire pair, or other type of connection, such as an optical fiber, that permits the transport of data. In one exemplary embodiment, the data connection 166 is implemented via an Ethernet cable, such as a Category 5 (Cat 5) cable.

As will be described in more detail below, information for enabling crosstalk vectoring between the DSLAMs 33 and 152 is passed via the connection 166. As shown by FIG. 6, the client DSLAM 152 has a connector 165, which will be used to pass crosstalk vectoring information in the event that other DSLAMs are added to the network access point 25, as will be described in more detail below. Like the connectors 75, 102, and 105 for the host DSLAM 33, the connectors 156, 162, and 165 of the client DSLAM 152 pass through a housing wall of the client DSLAM 152 such that electrical connectivity with these connectors 156, 162 and 165 can be made without necessarily accessing the interior of the DLSAM 152.

Figure 7:
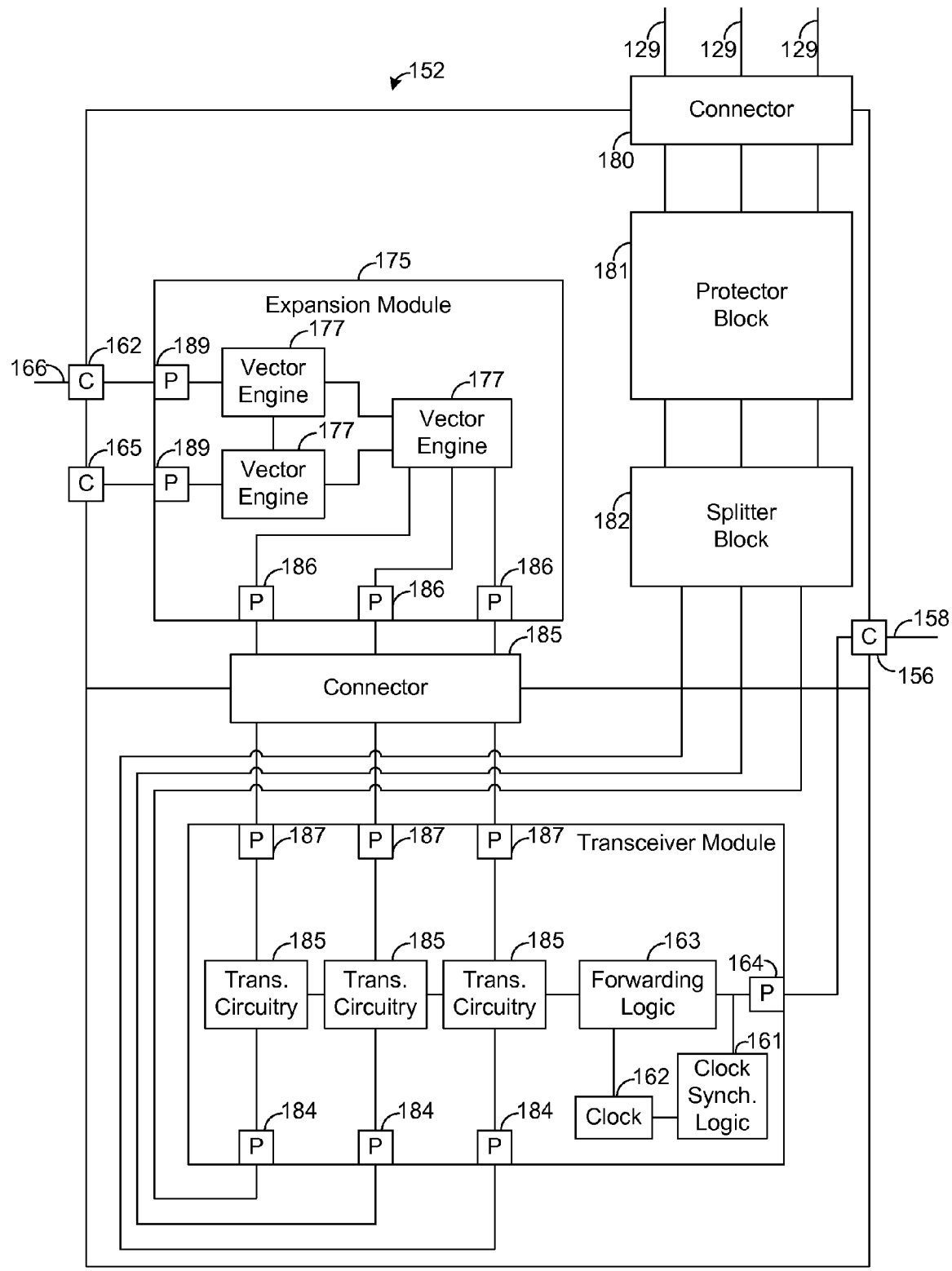
FIG. 7 is a block diagram illustrating an exemplary embodiment of a client DSLAM, such as is depicted by FIG. 6.

FIG. 7 depicts an exemplary embodiment of the client DSLAM 152. As can be seen by comparing FIG. 7 to FIG. 3, the configuration of the client DSLAM 152 is similar to the configuration of the host DSLAM 33. Indeed, the client DSLAM has a connector 180, protector block 181, and splitter board 182 similar to the connector 55, protector block 58, and splitter board 59 of FIG. 4.

As shown by FIG. 7, the client DSLAM 152 also has a transceiver module 160 similar to the module 52 shown in FIG. 3. Packets received from the host DSLAM 33 via the connector 156 and a port 164 are mapped to ports 184 of the transceiver module 160 by forwarding logic 163, and sets of transceiver circuitry 185 process the packets similar to the way that sets of the transceiver circuitry 81 of the host DSLAM 33 process packets. Thus, sets of the transceiver circuitry 185 of the client DSLAM 152 modulate carrier signals with the packets from the forwarding logic 163 and transmit the modulated signals across the subscriber lines 129.

The transceiver module 160 also has clock synchronization logic 161 that is configured to receive timing information from the host DSLAM 33 and to adjust a timing of a clock 162 such that the clock 162 remains synchronous to the clock 62 (FIG. 3) of the host DSLAM 33. Various known clock synchronization techniques and circuits may be used to keep the clock 162 of the client DSLAM 162 synchronous to the clock 62 of the host DSLAM 33.

The client DSLAM 152 also has an expansion module 175, like the expansion module 90 of FIG. 3. As described above for host DSLAM 33, the client DSLAM 152 is initially manufactured without the expansion module 175 in order to keep the manufacturing cost of the client DSLAM 152 low. When migration to a crosstalk vectoring solution for the client DSLAM 152 is desired, the expansion module 175 may be added and interfaced with the transceiver module 160, as shown by FIG. 7. In particular, ports 186 of the expansion module 175 may be conductively coupled to ports 187 of the transceiver module 160 through a connector 188. In addition, ports 189 of the expansion module 175 may be conductively coupled to the connectors 162, 165.

Like the expansion module 90 of FIG. 3, the expansion module 175 has three vector engines 177, although other numbers of vector engines 177 are possible in other embodiments. The vector engines 177 of FIG. 7 are configured similarly to the vector engines 92 of FIG. 3 except that the vector engines 177 have sets of coefficients for cancelling crosstalk for the tones communicated across the subscriber lines 129 coupled to the client DSLAM 152 rather than sets of coefficients 111 for cancelling crosstalk for the tones communicated across the subscriber lines 29 coupled to the host DSLAM 33.

In this regard, when the client DSLAM 152 receives a set of symbols from the subscriber lines 129 coupled to it, the symbols are transmitted to the vector engines 177. The vector engines 177 use such symbols to cancel crosstalk interference caused by the interfering tones transmitted across the other subscriber lines 129 coupled to the client DSLAM 152. In addition, to enable cancellation of crosstalk from interfering tones transmitted across the subscriber lines 29 coupled to the host DSLAM 33, the vector engines 92 of the host DSLAM 33 transmit the symbols of such interfering tones to the vector engines 177 of the client DSLAM 152 via the connection 166. Thus, for the symbols received from the subscriber lines 129 coupled to the client DSLAM 152, the vector engines 177 are able to cancel crosstalk not only from interfering tones transmitted across such subscriber lines 129 but also crosstalk from interfering tones transmitted across the subscriber lines 29 coupled to the host DSLAM 33.

Note that the same effect is achieved for the downstream tones as well. In this regard, the vector engines 92 also transmit, to the client DSLAM 152 via the connection 166, the symbols to be transmitted by the host DSLAM 33 across the subscriber lines 29. Thus, the vector engines 177 can precode the symbols to be transmitted across the subscriber lines 129 coupled to the client DSLAM 152 in order to cancel crosstalk from both interfering tones transmitted across the subscriber lines 29 and interfering tones transmitted across the subscriber lines 129.

Similarly, the vector engines 177 of the client DSLAM 152 transmit, to the vector engines 92 of the host DSLAM 33, symbols of tones received by the client DSLAM 152 from the subscriber lines 129 and symbols of tones to be transmitted by the client DSLAM 152 across the subscriber lines 129. Thus, like the vector engines 177 of the client DSLAM 152 for the tones communicated across the subscriber lines 129, the vector engines 92 of the host DSLAM 33 are configured to cancel from the tones communicated across the subscriber lines 29 crosstalk from both interfering tones transmitted across the subscriber lines 29 and interfering tones transmitted across the subscriber lines 129. Note that crosstalk is cancelled in both the upstream and downstream tones.

Note also that in order to cancel crosstalk induced by interfering tones communicated across the subscriber lines 29, the vector engines 177 maintain vector coefficients associated with such interfering tones. Thus, some of the vector coefficients maintained by the vector engines 177 are associated and combined with the tones communicated across the subscriber lines 129 and some of the vector coefficients maintained by the vector engines 177 are associated and combined with the tones communicated across the subscriber lines 29. Similarly, some of the vector coefficients maintained by the vector engines 92 are associated and combined with the tones communicated across the subscriber lines 29, and some of the vector coefficients maintained by the vector engines 92 are associated and combined with the tones communicated across the subscriber lines 129.

Figure 8:
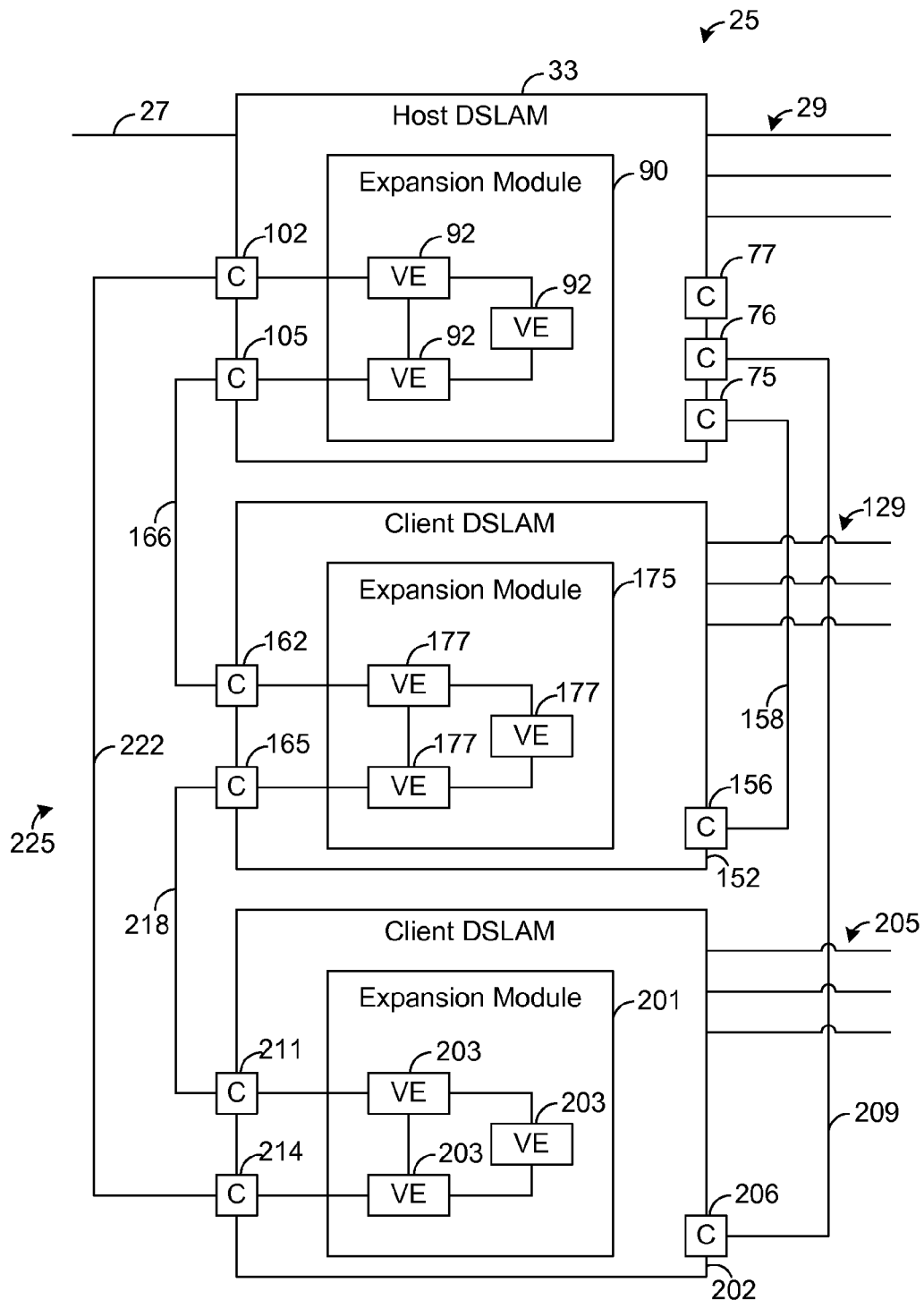
FIG. 8 is a block diagram illustrating an exemplary embodiment of a network access point, such as is depicted by FIG. 1.

In addition, if the capacity to handle more subscriber lines is desired, additional DSLAMs can be added to the network access point 25 at any time. As an example, FIG. 8 depicts an exemplary embodiment in which another client DSLAM 202 has been added relative to the embodiment depicted by FIG. 6. In one exemplary embodiment, the client DSLAM 202 is configured identically to the exemplary client DSLAM 152 shown by FIG. 7 and, thus, has an expansion module 201 comprising three vector engines 203 that can be inserted into the DSLAM 202 to enable crosstalk vectoring, although the expansion module 201 may have other numbers of vector engines 203 in other embodiments.

As shown by FIG. 8, the client DSLAM 202 is coupled to one or more subscriber lines 205 extending to CPE 15 (FIG. 1) at one or more customer premises 21. The client DSLAM 202 has a connector 206, like the connector 156 of FIG. 7, for communicating data with the host DSLAM 33. Specifically, the connector 206 is coupled to the connector 76 of the host DSLAM 33 via a data connection 209. The connection 209 may be any type of conductive connection, such as a twisted-wire pair, or other type of connection, such as an optical fiber, that permits the transport of data. In one exemplary embodiment, the data connection 209 is implemented via an Ethernet cable, such as a Category 5 (Cat 5) cable.

When the host DSLAM 33 receives a packet to be communicated across the subscriber lines 205 coupled to the client DSLAM 202, the host DSLAM 33 forwards the packet to the client DSLAM 202 via the connection 209, and the client DSLAM 202 transmits the packet across at least one of the subscriber lines 205 coupled to it. When the client DSLAM 202 receives from the subscriber lines 205 a packet to be forwarded to the network 12, the client DSLAM 202 forwards the packet to the host DSLAM 33 via the connection 209, and the host DSLAM 33 transmits the packet to the network 12 via the line 27.

Further, the client DSLAM 202 has connectors 211 and 214, like the connectors 162 and 165 of FIG. 7, that are used to pass vector information. Specifically, the connector 211 is coupled to the connector 165 of the client DSLAM 152 via a data connection 218, and the connector 214 is coupled to the connector 102 of the host DSLAM 33 via a data connection 222. Each of the data connections 218 and 222 may be any type of conductive connection, such as a twisted-wire pair, or other type of connection, such as an optical fiber, that permits the transport of data. In one exemplary embodiment, each of the data connections 218 and 222 is implemented via an Ethernet cable, such as a Category 5 (Cat 5) cable.

The connections 166, 218, and 222 form a ring connector 225 that allows vector information be passed from one DSLAM to the next in a round-robin fashion or otherwise, as will be described in more detail hereafter. For example, in one exemplary embodiment, the host DSLAM 33 receives, from the vector engines 203 of the client DSLAM 202 via the connection 222, symbol data indicating the symbols communicated via the subscriber lines 129, 205 by the client DSLAMs 152, 202, respectively. Note that the symbols communicated by the client DSLAM 152 are received by the client DSLAM 202 from the connection 218, as will be further described below. The vector engines 92 use such information to cancel from the symbols communicated by the host DSLAM 33 crosstalk induced by the symbols communicated by the client DSLAMs 152, 202.

In particular, for the symbols received by the host DSLAM 33 from the subscriber lines 29 coupled to it, the vector engines 92 combine symbols from the connection 222 with vector coefficients maintained by the vector engines 92 to estimate the amount of crosstalk induced by the symbols received from the subscriber lines 129, 205 by the client DSLAMs 152, 202, respectively. The vector engines 92 then subtract the estimated crosstalk contributions from the symbols received by the host DSLAM 33 in order to cancel crosstalk from such symbols. For each symbol received by the host DSLAM 33 from a respective subscriber line 29, the vector engines 92 also cancel the crosstalk induced by other interfering tones received by the host DSLAM 33 from the subscriber lines 29.

For the symbols transmitted by the host DSLAM 33 across the subscriber lines 29 coupled to it, the vector engines 92 combine symbols from the connection 222 with vector coefficients maintained by the vector engines 92 to estimate the amount of crosstalk to be induced by the symbols transmitted across the subscriber lines 129, 205 by the client DSLAMs 152, 202, respectively. The vector engines 92 then combine the inverse of the estimated crosstalk contributions with the symbols to be transmitted by the host DSLAM 33 in order to precode such symbols for crosstalk cancellation. For each symbol transmitted by the host DSLAM 33 across a respective subscriber line 29, the vector engines 92 also precode the transmitted symbol to cancel the crosstalk induced by other interfering tones transmitted by the host DSLAM 33 across the subscriber lines 29.

The vector engines 92 of the host DSLAM 33 transmit, to the vector engines 177 of the client DSLAM 152 via the connection 166, symbol data indicating the symbols communicated via the subscriber lines 205 and 29 by the client DSLAM 202 and the host DSLAM 33, respectively. Note that the symbols communicated by the client DSLAM 202 are received by the host DSLAM 33 from the connection 222. The vector engines 177 use such information to cancel from the symbols communicated by the client DSLAM 152 crosstalk induced by the symbols communicated by the client DSLAM 202 and the host DSLAM 33.

In particular, for the symbols received by the client DSLAM 152 from the subscriber lines 129 coupled to it, the vector engines 177 combine symbols from the connection 166 with vector coefficients maintained by the vector engines 177 to estimate the amount of crosstalk induced by the symbols received from the subscriber lines 205 and 29 by the client DSLAM 202 and the host DSLAM 33, respectively. The vector engines 177 then subtract the estimated crosstalk contributions from the symbols received by the client DSLAM 152 in order to cancel crosstalk from such symbols. For each symbol received by the client DSLAM 152 from a respective subscriber line 129, the vector engines 177 also cancel the crosstalk induced by other interfering tones received by the client DSLAM 177 from the subscriber lines 129.

For the symbols transmitted by the client DSLAM 152 across the subscriber lines 129 coupled to it, the vector engines 177 combine symbols from the connection 166 with vector coefficients maintained by the vector engines 177 to estimate the amount of crosstalk to be induced by the symbols transmitted across the subscriber lines 205 and 33 by the client DSLAM 202 and the host DSLAM 33, respectively. The vector engines 177 then combine the inverse of the estimated crosstalk contributions with the symbols to be transmitted by the client DSLAM 152 in order to precode such symbols for crosstalk cancellation. For each symbol transmitted by the client DSLAM 152 across a respective subscriber line 129, the vector engines 177 also precode the transmitted symbol to cancel the crosstalk induced by other interfering tones transmitted by the client DSLAM 152 across the subscriber lines 129.

The vector engines 177 of the client DSLAM 152 transmit, to the vector engines 203 of the client DSLAM 202 via the connection 218, symbol data indicating the symbols communicated via the subscriber lines 129 and 29 by the client DSLAM 152 and the host DSLAM 33, respectively. Note that the symbols communicated by the host DSLAM 33 are received by the client DSLAM 152 from the connection 166. The vector engines 203 use such information to cancel from the symbols communicated by the client DSLAM 202 crosstalk induced by the symbols communicated by the client DSLAM 152 and the host DSLAM 33.

In particular, for the symbols received by the client DSLAM 202 from the subscriber lines 205 coupled to it, the vector engines 203 combine symbols from the connection 218 with vector coefficients maintained by the vector engines 203 to estimate the amount of crosstalk induced by the symbols received from the subscriber lines 129 and 29 by the client DSLAM 152 and the host DSLAM 33, respectively. The vector engines 203 then subtract the estimated crosstalk contributions from the symbols received by the client DSLAM 202 in order to cancel crosstalk from such symbols. For each symbol received by the client DSLAM 202 from a respective subscriber line 205, the vector engines 203 also cancel the crosstalk induced by other interfering tones received by the client DSLAM 202 from the subscriber lines 205.

For the symbols transmitted by the client DSLAM 202 across the subscriber lines 205 coupled to it, the vector engines 203 combine symbols from the connection 218 with vector coefficients maintained by the vector engines 203 to estimate the amount of crosstalk to be induced by the symbols transmitted across the subscriber lines 129 and 29 by the client DSLAM 152 and the host DSLAM 33, respectively. The vector engines 203 then combine the inverse of the estimated crosstalk contributions with the symbols to be transmitted by the client DSLAM 202 in order to precode such symbols for crosstalk cancellation. For each symbol transmitted by the client DSLAM 202 across a respective subscriber line 205, the vector engines 203 also precode the transmitted symbol to cancel the crosstalk induced by other interfering tones transmitted by the client DSLAM 202 across the subscriber lines 205.

Note that it is unnecessary for symbols to be transmitted in the same direction around the ring connector 225, as in the exemplary embodiment described above. As an example, noting that each connection 166, 218, and 222 is bi-directional, it is possible for the vector engines 177 to transmit, to the vector engines 92 of the host DSLAM 33 via the connection 166, symbol data indicating the symbols communicated via the subscriber lines 129 by the client DSLAM 152. Thus, such symbol data is received by the expansion module 90 of the host DSLAM 33 via the connection 166 and by the expansion module 201 of the client DSLAM 202 via the connection 218. In such an embodiment, there is no need to transmit this symbol data via the connection 222. Similarly, symbol data indicating the symbols communicated via the subscriber lines 29 may be transmitted from the host DSLAM 33 to the client DSLAM 152 via the connection 166 and to the client DSLAM 202 via the connection 222 such that communication of this symbol data across the connection 218 is unnecessary, and symbol data indicating the symbols communicated via the subscriber lines 205 may be transmitted from the client DSLAM 202 to the host DSLAM 33 via the connection 222 and to the client DSLAM 152 via the connection 218 such that communication of this symbol data across the connection 166 is unnecessary. Yet other techniques for communicating symbol data via the ring connector 225 are possible in other embodiments. In any event, each expansion module 90, 175, and 201 has access to the symbol data communicated across each set of subscriber lines 29, 129 and 205 thereby enabling each expansion module to cancel crosstalk originating from any subscriber line.

Figure 9:
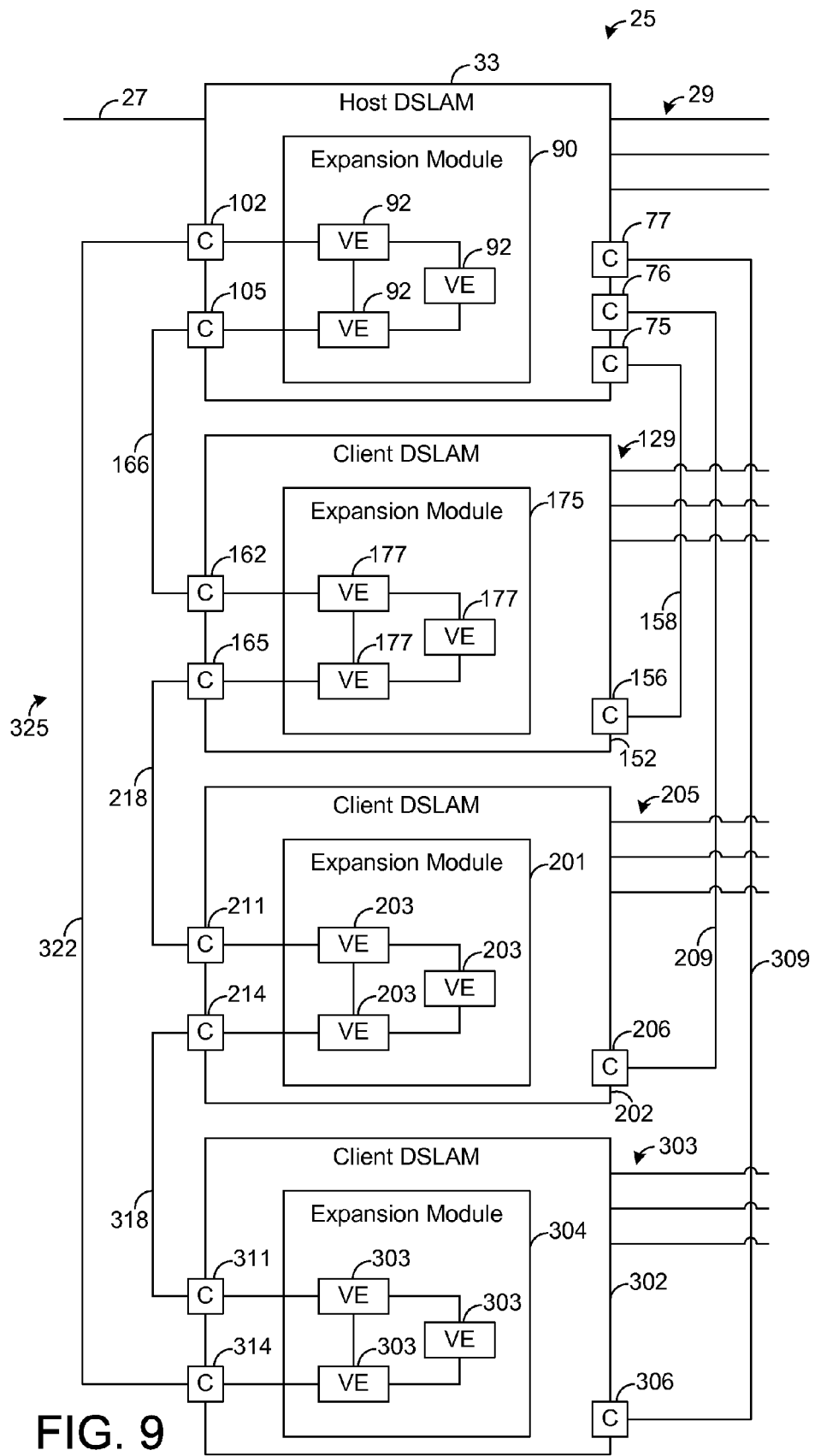
FIG. 9 is a block diagram illustrating an exemplary embodiment of a network access point, such as is depicted by FIG. 1.

FIG. 9 depicts an exemplary embodiment in which an additional client DSLAM 302 has been added to the network access point 25 relative to the embodiment shown by FIG. 8 and coupled to a plurality of subscriber lines 303, which extend to CPE 15 (FIG. 1) at one or more customer premises 21. In one exemplary embodiment, the client DSLAM 302 is configured identically to the exemplary client DSLAM 152 shown by FIG. 7, except as otherwise described herein, and thus has three vector engines 303 that are implemented on an expansion module 304 that can be inserted into the DSLAM 302 to enable crosstalk vectoring, although the expansion module 304 may have other numbers of vector engines 303 in other embodiments.

As shown by FIG. 9, the client DSLAM 302 has a connector 306, like the connector 156 of FIG. 7, for communicating data with the host DSLAM 33. Specifically, the connector 306 is coupled to the connector 77 of the host DSLAM 33 via a data connection 309. The connection 309 may be any type of conductive connection, such as a twisted-wire pair, or other type of connection, such as an optical fiber, that permits the transport of data. In one exemplary embodiment, the data connection 309 is implemented via an Ethernet cable, such as a Category 5 (Cat 5) cable.

When the host DSLAM 33 receives a packet to be communicated across the subscriber lines 303 coupled to the client DSLAM 302, the host DSLAM 33 forwards the packet to the client DSLAM 302 via the connection 309, and the client DSLAM 302 transmits the packet across at least one of the subscriber lines 303 coupled to it. When the client DSLAM 302 receives from the subscriber lines 303 a packet to be forwarded to the network 12, the client DSLAM 302 forwards the packet to the host DSLAM 33 via the connection 309, and the host DSLAM 33 transmits the packet to the network 12 via the line 27.

Further, the client DSLAM 302 has connectors 311, 314, like the connectors 162, 165 of FIG. 7, that are used to pass vector information. Specifically, the connector 311 is coupled to the connector 214 of the client DSLAM 202 via a data connection 318, and the connector 314 is coupled to the connector 102 of the host DSLAM 33 via a data connection 322. Each of the connections 318 and 322 may be any type of conductive connection, such as a twisted-wire pair, or other type of connection, such as an optical fiber, that permits the transport of data. In one exemplary embodiment, each of the data connections 318 and 322 is implemented via an Ethernet cable, such as a Category 5 (Cat 5) cable. The connections 166, 218, 318, 322 form a ring connector 325 that allows vector information be passed from one DSLAM to the next in a round-robin fashion.

In this regard, the embodiment shown by FIG. 9 is configured to operate like the embodiment shown by FIG. 8 except that there is an additional DSLAM 302 connected via the ring connector 325. Thus, in one exemplary embodiment in which symbol data is communicated in the same direction around the ring connector 325 the host DSLAM 33 receives, from the vector engines 303 of the client DSLAM 302 via the connection 322, symbol data indicating the symbols communicated by the client DSLAMs 152, 202, 302 via the subscriber lines 129, 205, 303, respectively. Note that the symbols communicated by the client DSLAMs 152, 202 are received by the client DSLAM 302 from the connection 318, as will be further described below. The vector engines 92 use such information to cancel from the symbols communicated by the host DSLAM 33 via the subscriber lines 29 crosstalk induced by the symbols communicated by the client DSLAMs 152, 202, 302 via the subscriber lines 129, 205, 303, respectively. For each symbol communicated by the host DSLAM 33, the vector engines 92 also cancel crosstalk induced by other interfering tones communicated by the host DSLAM 33 via the subscriber lines 29.

The vector engines 92 of the host DSLAM 33 transmit, to the vector engines 177 of the client DSLAM 152 via the connection 166, symbol data indicating the symbols communicated via the subscriber lines 205, 303, and 29 by the client DSLAMs 202, 302 and the host DSLAM 33, respectively. Note that the symbols communicated by the client DSLAMs 202, 302 are received by the host DSLAM 33 from the connection 322. The vector engines 177 use such information to cancel from the symbols communicated by the client DSLAM 152 via the subscriber lines 129 crosstalk induced by the symbols communicated by the client DSLAMs 202, 302 and the host DSLAM 33 via the subscriber lines 205, 303, and 29, respectively. For each symbol communicated by the client DSLAM 152, the vector engines 177 also cancel crosstalk induced by other interfering tones communicated by the client DSLAM 152 via the subscriber lines 129.

The vector engines 177 of the client DSLAM 152 transmit, to the vector engines 203 of the client DSLAM 202 via the connection 218, symbol data indicating the symbols communicated via the subscriber lines 129, 303, and 29 by the client DSLAMs 152, 302 and the host DSLAM 33, respectively. Note that the symbols communicated by the host DSLAM 33 and the client DSLAM 302 are received by the client DSLAM 152 from the connection 166. The vector engines 203 use such information to cancel from the symbols communicated by the client DSLAM 202 via the subscriber lines 205 crosstalk induced by the symbols communicated by the client DSLAMs 152, 302 and the host DSLAM 33 via the subscriber lines 129, 303, and 29, respectively. For each symbol communicated by the client DSLAM 202, the vector engines 203 also cancel crosstalk induced by other interfering tones communicated by the client DSLAM 202 via the subscriber lines 205.

The vector engines 203 of the client DSLAM 202 transmit, to the vector engines 303 of the client DSLAM 302 via the connection 318, symbol data indicating the symbols communicated via the subscriber lines 129, 205, and 29 by the client DSLAMs 152, 202 and the host DSLAM 33, respectively. Note that the symbols communicated by the host DSLAM 33 and the client DSLAM 152 are received by the client DSLAM 202 from the connection 218. The vector engines 303 use such information to cancel from the symbols communicated by the client DSLAM 302 via the subscriber lines 303 crosstalk induced by the symbols communicated by the client DSLAMs 152, 202 and the host DSLAM 33 via the subscriber lines 129, 205, and 29, respectively. For each symbol communicated by the client DSLAM 302, the vector engines 303 also cancel crosstalk induced by other interfering tones communicated by the client DSLAM 302 via the subscriber lines 303.

Note that, as described above for the embodiment shown by FIG. 8, it is unnecessary for the symbol data to be communicated around the ring connector 325 in the same direction. For example, the symbol data indicating the symbols communicated via the subscriber lines 303 may be transmitted from the client DSLAM 303 to the host DSLAM 33 via the connection 322, while such symbol data is transmitted from the client DSLAM 303 to the client DSLAMs 202 and 152 via the connections 318 and 218. Regardless of the directions of transmission for the symbol data, each expansion module 90, 175, 201, and 304 receives the symbols communicated across all of the subscriber lines 29, 129, 205, and 303 thereby enabling each expansion module to cancel crosstalk originating from any subscriber line.

An exemplary use and operation of the network access point 25 will now be described in more detail below.

For illustrative purposes, assume that a service provider initially installs the host DSLAM 33 only without inserting the expansion module 90 into the host DSLAM 33. Thus, initially, the host DSLAM 33 services a number of subscriber lines 29 without performing crosstalk vectoring. However, assume that as demand increases, the service provider decides to add a client DSLAM 152 in order to increase the number of subscriber lines serviced by the network access point 25. Notably, the addition of the client DSLAM 152 increases the crosstalk interference level for the signals communicated across the subscriber lines 29.

Thus, assume that the service provider deems it desirable to migrate to a crosstalk vectoring solution upon adding the client DSLAM 152. In such case, the service provider inserts an expansion module 90 into the host DSLAM 33 and an expansion module 175 into the client DSLAM 152. Further, the service provider couples the connector 75 of the host DSLAM 33 to the connector 156 of the client DSLAM 152 via connection 158, as shown by FIG. 6. The service provider also couples the connector 105 of the host DSLAM 33 to the connector 162 of the client DSLAM 152, as shown by FIG. 6. Thereafter, the host DSLAM 33 and the client DSLAM 152 communicate via the subscriber lines 29 and 129, respectively, and perform crosstalk vectoring to cancel crosstalk from the signals communicated across the subscriber lines 29 and 129, as described above for the embodiment described by FIG. 6.

Assume that as demand increases, the service provider decides to add another client DSLAM 202 in order to increase the number of subscriber lines serviced by the network access point 25. In such case, the service provider inserts an expansion module 201 into the client DSLAM 202 and couples the connector 76 of the host DSLAM 33 to the connector 206 of the client DSLAM 202 via connection 209, as shown by FIG. 8. The service provider also couples the connector 102 of the host DSLAM 33 to the connector 214 of the client DSLAM 202 via connection 222, and the service provider couples the connector 165 of the client DSLAM 152 to the connector 211 of the client DSLAM 202, via connection 218 as shown by FIG. 8. Thereafter, the client DSLAMs 152, 202 and the host DSLAM 33 communicate via the subscriber lines 129, 205, and 29 respectively, and perform crosstalk vectoring to cancel crosstalk from the signals communicated across the subscriber lines 129, 205, and 29 as described above for the embodiment described by FIG. 8.

Assume that as demand increases, the service provider decides to add yet another client DSLAM 302 in order to increase the number of subscriber lines serviced by the network access point 25. In such case, the service provider inserts an expansion module 304 into the client DSLAM 302 and couples the connector 77 of the host DSLAM 33 to the connector 306 of the client DSLAM 202 via connection 309, as shown by FIG. 9. The service provider also removes the connection 222 (FIG. 8) between the connectors 102 and 214 and then couples the connector 102 of the host DSLAM 33 to the connector 314 of the client DSLAM 302, and the service provider couples the connector 214 of the client DSLAM 202 to the connector 311 of the client DSLAM 302, as shown by FIG. 9. Thereafter, the client DSLAMs 152, 202, 302 and the host DSLAM 33 communicate via the subscriber lines 129, 205, 303, and 29 respectively, and perform crosstalk vectoring to cancel crosstalk from the signals communicated across the subscriber lines 129, 205, 303, and 29 as described above for the embodiment described by FIG. 9.

It should be noted that, for simplicity of illustration, three subscriber lines are shown to be coupled to each respective DSLAM in various embodiments described above. However, in other embodiments, any number of subscriber lines may be coupled to any of the DSLAMs. In one exemplary embodiment, each transceiver module has forty-eight subscriber line ports that may be coupled to subscriber lines thereby enabling each DSLAM to service up to forty-eight subscriber lines. However, other numbers of ports are possible in other embodiments.

In addition, the connections between the DSLAMs, such as connections 158, 209, 225, 309, 325, are described as being physical connections, such as conductive connections or optical fibers. However, it is possible for the DSLAMs to be configured to communicate with one another wirelessly, if desired.

Figure 10:
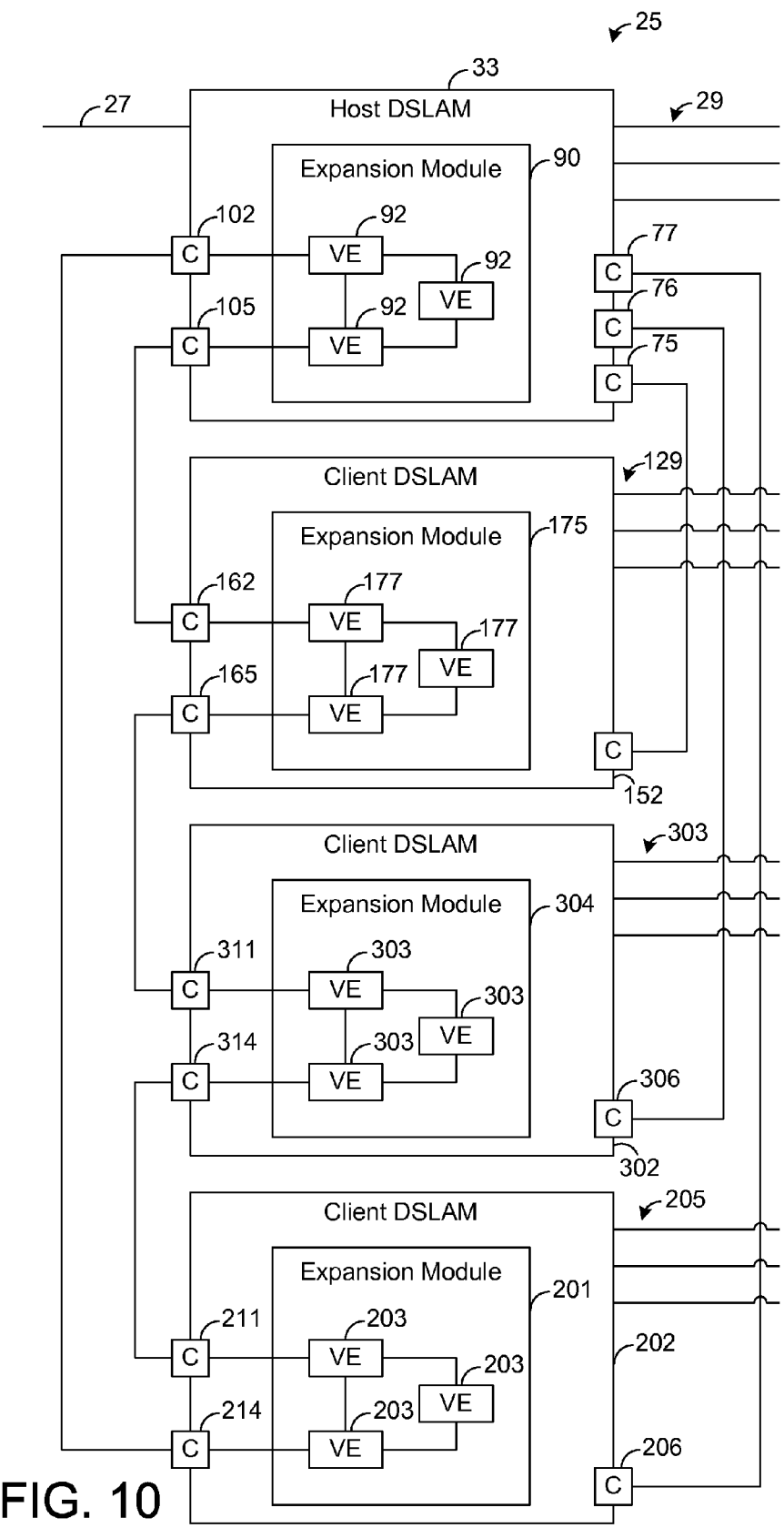
FIG. 10 is a block diagram illustrating an exemplary embodiment of a network access point, such as is depicted by FIG. 1.

When adding a new DSLAM, the order of the DSLAMs may be changed in any manner. For example, rather than add the DSLAM 302 as shown by FIG. 9, the new DSLAM 302 may be inserted into the position of the DSLAM 202 such that the new DSLAM 302 is the third one in the daisy chain of DSLAMs, as shown by FIG. 10. Various other rearranging of the DSLAM order may be performed in yet other embodiments.

It should be further noted that the network access point 25 can be configured to interface any number of DSLAMs via techniques similar to those described above. Further, the service provider may elect to migrate to a crosstalk vectoring solution for any DSLAM at any time. For example, the service provider may migrate to a crosstalk vectoring solution at the original installation of the host DSLAM 33 and other client DSLAMs 152, 202, 302, if any. Further, it is unnecessary to add DSLAMs one at a time. As an example, the host DSLAM 33 and any number of client DSLAMs 152, 202, 302 may be implemented via the original installation performed by the service provider. Alternatively, any number of client DSLAMs 152, 202, 302 may be installed at a single time. As an example, after installing the host DSLAM 33, the client DSLAMs 152, 202 may be added at the same time or the client DSLAMs 152, 202, 302 may be added at the same time. Various other changes and modifications to the exemplary embodiments described herein would be readily apparent to one of ordinary skill upon reading this disclosure.

Now, therefore, the following is claimed:

1. A network access point, comprising:
a first digital subscriber line access multiplexer (DSLAM) having a first transceiver module and a first expansion module, wherein the first transceiver module has transceiver circuitry coupled to a first plurality of subscriber lines, and wherein the first expansion module has at least one vector engine;
a second DSLAM having a second transceiver module and a second expansion module, wherein the second transceiver module has transceiver circuitry coupled to a second plurality of subscriber lines, and wherein the second expansion module has at least one vector engine;
a third DSLAM having a third transceiver module and a third expansion module, wherein the third transceiver module has transceiver circuitry coupled to a third plurality of subscriber lines, and wherein the third expansion module has at least one vector engine; and
a ring connector coupling the first DSLAM to the second and third DSLAMs, the ring connector comprising a first data connection, a second data connection, and a third data connection, wherein the first data connection couples the first DSLAM to the second DSLAM, wherein the second data connection couples the second DSLAM to the third DSLAM, wherein the third data connection is coupled to the third DSLAM, wherein the first, second, and third DSLAMs are configured to communicate crosstalk vectoring information via the ring connector, wherein the first expansion module is configured to use the crosstalk vectoring information to cancel crosstalk from symbols carried by the first plurality of subscriber lines, wherein the second expansion module is configured to use the crosstalk vectoring information to cancel crosstalk from symbols carried by the second plurality of subscriber lines, and wherein the third expansion module is configured to use the crosstalk vectoring information to cancel crosstalk from symbols carried by the third plurality of subscriber lines, and wherein the crosstalk vectoring information from each of a plurality of the DSLAMs is communicated across the first data connection.

2. The network access point of claim 1, wherein the first transceiver module is inserted into a first compartment of a housing for the first DSLAM, wherein the first expansion module is inserted into a second compartment of the housing.

3. The network access point of claim 2, wherein the housing has an interior wall separating the first compartment from the second compartment, and wherein the first expansion module is coupled to the first transceiver module through the interior wall.

4. The network access point of claim 3, wherein the first DSLAM has a connector passing through the interior wall, wherein the first expansion module is detachably coupled to the connector.

5. The network access point of claim 1, wherein the first data connection extends from the first DSLAM to the second DSLAM, wherein the second data connection extends from the second DSLAM to the third DSLAM, and wherein the third data connection is coupled to the third DSLAM.

6. The network access point of claim 5, wherein the third data connection extends from the third DSLAM to the first DSLAM.

7. The network access point of claim 5, further comprising a fourth DSLAM having a fourth transceiver module and a fourth expansion module, wherein the fourth transceiver module has transceiver circuitry coupled to a fourth plurality of subscriber lines, wherein the fourth expansion module has at least one vector engine, wherein the crosstalk vectoring information communicated via the ring connector comprises first symbols and second symbols, wherein the first symbols are carried by the third plurality of subscriber lines, wherein the second symbols are carried by the fourth plurality of subscriber lines, wherein the third DSLAM is coupled to the fourth DSLAM via the third data connection, and wherein the third DSLAM is configured to transmit the first and second symbols to the second DSLAM via the second data connection.

8. The network access point of claim 1, wherein the crosstalk vectoring information communicated via the ring connector comprises first symbols and second symbols, wherein the first symbols are carried by the first plurality of subscriber lines, wherein the second symbols are carried by the second plurality of subscriber lines, and wherein the third DSLAM is configured to receive the first symbols and the second symbols from the second DSLAM via the ring connection.

9. The network access point of claim 1, wherein the crosstalk vectoring information from each of the plurality of the DSLAMs is communicated across the second data connection and the third data connection.

10. A method, comprising:
installing a first digital subscriber line access multiplexer (DSLAM) at a network access point such that the first DSLAM is coupled to a first plurality of subscriber lines;
inserting at least one vector engine into the first DSLAM;
installing a second DSLAM at the network access point such that the second DSLAM is coupled to a second plurality of subscriber lines;
inserting at least one vector engine into the second DSLAM;
installing a third DSLAM at the network access point such that the third DSLAM is coupled to a third plurality of subscriber lines;
inserting at least one vector engine into the third DSLAM;
coupling the first DSLAM to the second and third DSLAMs via a ring connector, the ring connector comprising a first data connection, a second data connection, and a third data connection, wherein the first data connection couples the first DSLAM to the second DSLAM, wherein the third data connection couples the third DSLAM to the first DSLAM, and wherein the second data connection is coupled to the second DSLAM;
communicating crosstalk vectoring information among the first, second, and third DSLAMs via the ring connector, wherein the communicating comprises communicating the crosstalk vectoring information from each of a plurality of the DSLAMs across the first data connection;
cancelling, via the at least one vector engine inserted into the first DSLAM, crosstalk from symbols carried by the first plurality of subscriber lines based on the crosstalk vectoring information;
cancelling, via the at least one vector engine inserted into the second DSLAM, crosstalk from symbols carried by the second plurality of subscriber lines based on the crosstalk vectoring information; and
cancelling, via the at least one vector engine inserted into the third DSLAM, crosstalk from symbols carried by the third plurality of subscriber lines based on the crosstalk vectoring information.

11. The method of claim 10, wherein crosstalk vectoring information communicated via the ring connector comprises first symbols carried by the first plurality of subscriber lines and second symbols carried by the second plurality of subscriber lines, wherein the communicating comprises transmitting the first symbols and the second symbols to the third DSLAM via the ring connector.

12. The method of claim 11, further comprising:
installing a fourth DSLAM at the network access point such that the fourth DSLAM is coupled to a fourth plurality of subscriber lines; and
inserting at least one vector engine into the fourth DSLAM wherein the communicating comprises transmitting the first and second symbols to the fourth DLSAM via the second data connection.

13. The method of claim 10, wherein the first DSLAM has a housing, wherein the housing has a first compartment and a second compartment separated by a wall, wherein the inserting the at least one vector engine into the first DSLAM comprises inserting an expansion module into the first compartment, wherein the method further comprises coupling the expansion module to a transceiver module situated in the second compartment, and wherein the cancelling the crosstalk from the symbols carried by the first plurality of subscriber lines is performed by the expansion module.

14. The method of claim 13, wherein the coupling the expansion module comprises coupling the expansion module to a connector passing through the wall, and wherein the connector is coupled to the transceiver module.

15. The method of claim 13, further comprising transmitting data signals via the first DSLAM across the first plurality of subscriber lines, wherein the inserting the expansion module is performed subsequent to the transmitting.

16. The method of claim 13, wherein the first data connection extends from the first DSLAM to the second DSLAM, wherein the third data connection extends from the third DSLAM to the first DSLAM.

17. The method of claim 13, wherein the communicating comprises communicating the crosstalk vectoring information from each of the plurality of the DSLAMs across the second data connection and the third data connection.

18. The method of claim 16, wherein the second data connection extends from the second DSLAM to the third DSLAM.

* * * * *